(12) United States Patent
Maurer

(10) Patent No.: US 9,492,874 B2
(45) Date of Patent: Nov. 15, 2016

(54) CHUCK

(71) Applicant: SMW-AUTOBLOK Spannsysteme GmbH, Meckenbeuren (DE)

(72) Inventor: Eckhard Maurer, Oberteuringen (DE)

(73) Assignee: SMW-AUTOBLOK Spannsysteme GmbH, Meckenbeuren (DE)

( * ) Notice: Subject to any disclaimer, the term of this patent is extended or adjusted under 35 U.S.C. 154(b) by 93 days.

(21) Appl. No.: 14/454,047

(22) Filed: Aug. 7, 2014

(65) Prior Publication Data
US 2015/0042051 A1 Feb. 12, 2015

(30) Foreign Application Priority Data
Aug. 7, 2013 (EP) .................................. 13179575

(51) Int. Cl.
*B23B 31/16* (2006.01)
*B23B 31/00* (2006.01)

(52) U.S. Cl.
CPC ......... *B23B 31/1605* (2013.01); *B23B 31/001* (2013.01); *B23B 31/16045* (2013.01); *B23B 31/16* (2013.01); *B23B 2231/28* (2013.01); *B23B 2231/36* (2013.01); *B23B 2260/126* (2013.01); *Y10T 279/1973* (2015.01); *Y10T 279/1986* (2015.01); *Y10T 279/3462* (2015.01); *Y10T 279/3493* (2015.01)

(58) Field of Classification Search
CPC .................... B23B 31/16045; B23B 31/1605; B23B 31/001; B23B 31/16; B23B 2260/126; B23B 2231/36; Y10T 279/1973; Y10T 279/1986; Y10T 279/3493
See application file for complete search history.

(56) References Cited

U.S. PATENT DOCUMENTS

| | | | | |
|---|---|---|---|---|
| 2,538,521 | A | 1/1951 | Huntting | |
| 2,602,673 | A * | 7/1952 | Deurig | B23B 31/16045 279/112 |
| 2,903,268 | A | 9/1959 | Buck et al. | |
| 5,387,038 | A * | 2/1995 | Abe | F16C 29/084 384/15 |
| 5,492,413 | A * | 2/1996 | Tsukada | F16C 29/0647 384/15 |
| 6,299,179 | B1 * | 10/2001 | Sheffer | B23B 31/001 279/121 |

FOREIGN PATENT DOCUMENTS

| | | |
|---|---|---|
| DE | 317154 | 12/1919 |
| DE | 19502363 | 1/1996 |
| EP | 1759793 | 3/2007 |
| JP | H01140905 | 6/1989 |

* cited by examiner

*Primary Examiner* — Eric A Gates
*Assistant Examiner* — Chwen-Wei Su
(74) *Attorney, Agent, or Firm* — Pandiscio & Pandiscio

(57) ABSTRACT

A chuck for a machine tool for supporting rotationally symmetrical components, the chuck being adapted to prevent contamination of a guide groove area, wedge rods and the chuck body, in any operational position of the clamping jaws of the chuck.

6 Claims, 10 Drawing Sheets

CHUCK

BACKGROUND OF THE INVENTION

1. Field of the Invention

The present invention relates to a chuck provided on a machine tool for supporting shafts, hollow cylinders, or other rotationally symmetrical components.

2. Description of the Prior Art

A chuck of this kind is disclosed in DE 195 02 363 C1. In this chuck, a hole extending in the longitudinal direction of the chuck body is provided in one end of the chuck body, and an actuation piston is inserted therein so as to be axially movable. The actuation piston drives three wedge rods via intermediate elements. The wedge rods being mounted in holding pockets disposed in the chuck body and adapted to be moved axially therein. The wedge rods are provided with helical gearing which interacts with one clamping jaw each in a driving connection. Furthermore, three guide grooves extending radially are disposed in the free end of the chuck body, and one of the clamping jaws is adapted to be inserted into the guide groove. As soon as the clamping jaw is in a positive-locking active connection with the corresponding wedge rod via its helical gearing, the wedge rod can be moved via the actuation piston, and the helical gearing between the wedge rod and the underside of the clamping jaw causes the corresponding clamping jaw to be advanced radially in the direction of a workpiece to be clamped.

Chucks of this kind have proven effective in practice and are used in a large number of machine tools. When clamped workpieces are machined, contamination arises, for example, due to the cooling lubricants used, or as a result of metal chips separated from the workpiece. This contamination in the form of liquid particles, metal chips, and the like, is deposited in the guide grooves running in the direction of the workpiece, as a result of which increased friction occurs between the clamping jaw and the guide groove, or the wedge rod, as it advances. This causes the clamping force to be reduced, as a result of which reliable securing of the workpiece to be machined is no longer guaranteed. The guide grooves can be manually cleaned to remove the contamination, but this is time-consuming and thus costly.

This problem has been recognised, and in EP 1 759 793 B1 a chuck is described in which a lubricant supply is provided for each of the three guide grooves. The driving active connection between the clamping jaw and a clamping or actuation piston is effected using a wedge hook coupling according to this state-of-the-art.

It is a disadvantage in the operation of this chuck that has been disclosed that the lubricant emerges from the guide grooves due to the centrifugal forces in the direction of pockets in which counterweights are arranged. The pumps built into the pockets are intended to pump the lubricant collected in the pockets in the direction of the guide grooves. In this state-of-the-art, there is no permanent separate lubrication of the guide groove during the advance movement of the clamping jaws.

The guide grooves mean that contamination not only gets between the grooves and the clamping jaws, but in particular, also onto the wedge rods when these are actuated. It is a disadvantage that the wedge rods are not protected against contamination in the chuck body, and that lubricant exclusively enters between the clamping jaw and its guide grooves, and not at the wedge rod, or at least not in such a way that the helical gearing of the wedge rod and the clamping jaws is cleaned, or such that the contamination enters between the wedge rod and the inner wall of the chuck body and solidifies there, as a result of which the wedge rod has to be actuated against increased friction resistance. However, this reduces the clamping forces and leads to wear on the wedge rod, or the chuck body, as a result of which there are inaccuracies in clamping the workpieces.

SUMMARY OF THE INVENTION

It is thus the object of the present invention to provide a chuck of the aforementioned type in such a way that no contamination gets into either the area of the guide grooves, or and the clamping jaws, or into the area of the wedge rods and the chuck body, irrespective of the particular operating position of the clamping jaws, rather, such contamination ingress is prevented.

It is particularly advantageous if a sealing orifice is attached to the clamping jaw, and also if a sealing body is attached to the guide groove in the area of the inlet opening to the through-hole, because in that case the entry of contamination particles into the guide groove is prevented irrespective of the position of the particular clamping jaw. The clamping jaw can be operated in two positions, namely in one such that the clamping jaw partially projects into the through-hole running axially and, in another, such that the clamping jaw exclusively runs within the guide groove. If the clamping jaw is transferred into the through-hole, the sealing bar which is attached at the entrance area of the through-hole on the corresponding guide groove has the function of providing a seal, and if the clamping jaw is exclusively arranged in the guide groove then the function of preventing contamination ingress is carried out by the sealing body on the face end of the clamping jaw.

In addition, contamination ingress can be prevented in the area of the wedge rod. For this purpose, a sealing comb is provided aligned in parallel with the corresponding guide groove and comprising two components, namely a pin-like base body and a toothed comb. The toothed comb is provided with teeth pointing in the direction of the helical gearing of the wedge rod which engage in the helical gearing of the wedge rod. As soon as the wedge rod moves in the direction of the clamping jaw, the sealing comb is pushed synchronously with the clamping jaw through a stroke distance s, as a result of which there is no relative movement between the sealing comb and the wedge rod. This has the effect that the helical gearing of the wedge rod is permanently closed by the sealing comb, as a result of which no contamination particles can enter between the wedge rod and the chuck body within which the wedge rod is mounted in a movable arrangement.

Consequently, these three design measures, which can also be implemented independently from one another, mean that all openings that are required for technical reasons, due to the guide grooves, for accommodating the clamping jaws and due to the holding chamber for mounting the wedge rod are closed in any operational condition of the clamping jaw.

The clamping jaw is available as a spare part for chucks of this kind, which means it is a straightforward matter to provide at least one sealing orifice on the particular clamping jaw that can be inserted into the guide groove of the chuck in a watertight on/or airtight manner, as a result of which contamination ingress into the guide groove or the wedge rod of the chuck is prevented.

BRIEF DESCRIPTION OF THE DRAWINGS

The drawings show an illustrative embodiment of a chuck configured in accordance with the present invention, the details of which are explained below. In the drawings.

FIG. 1c is a magnified section in the area of the wedge rods shown in to FIG. 1a;

DESCRIPTION OF THE PREFERRED EMBODIMENTS

Figure 1A:
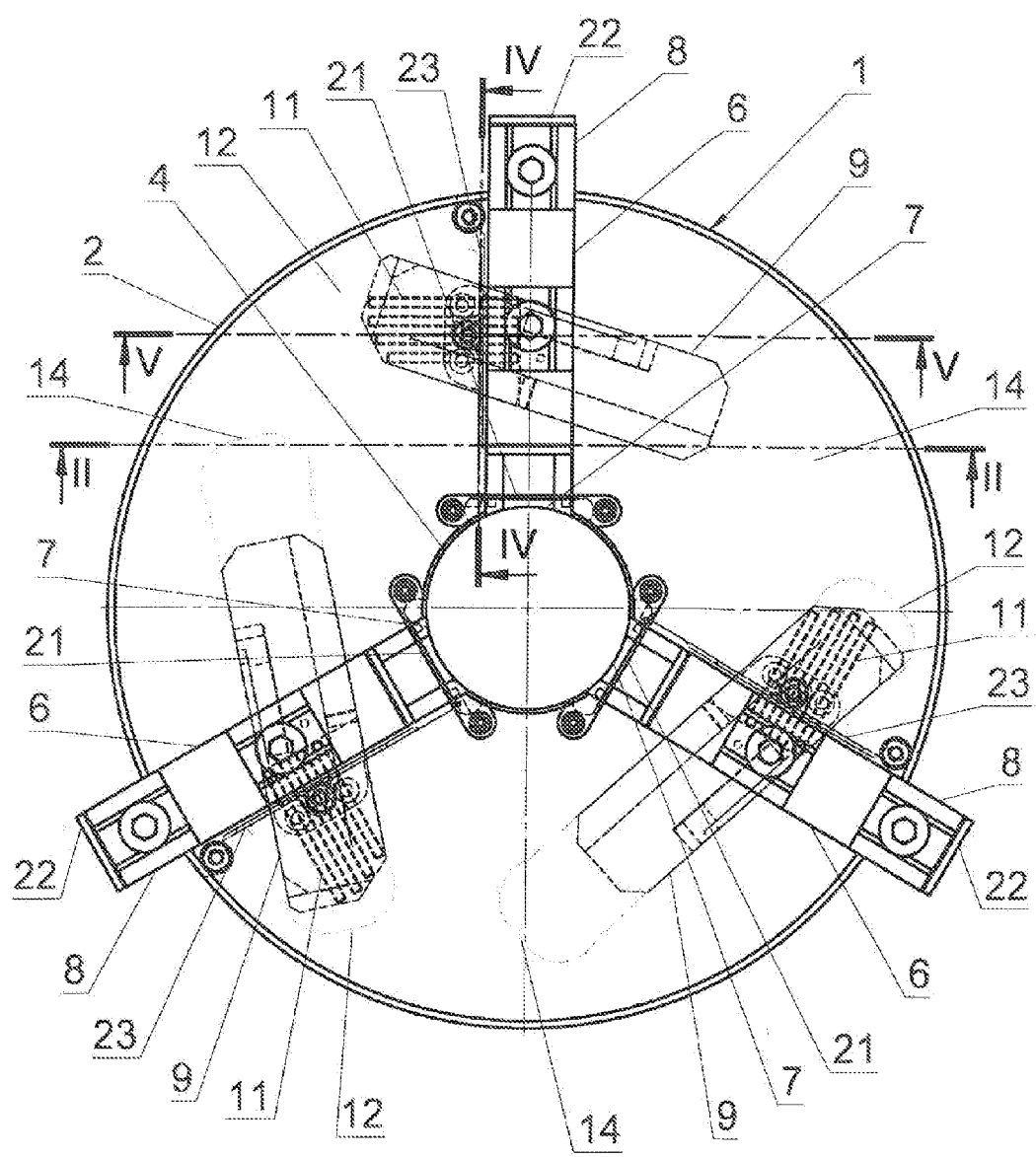
FIG. 1a is a plan view of a chuck with a chuck body in which three guide grooves are disposed, in which one clamping jaw in each case is mounted so as to be movable in a radial direction, and three wedge rods arranged at right angles to the clamping jaws are adapted to be advanced radially by means of the clamping jaws, in the operational status of the clamping jaws arranged in the guide grooves.
Figure 1B:
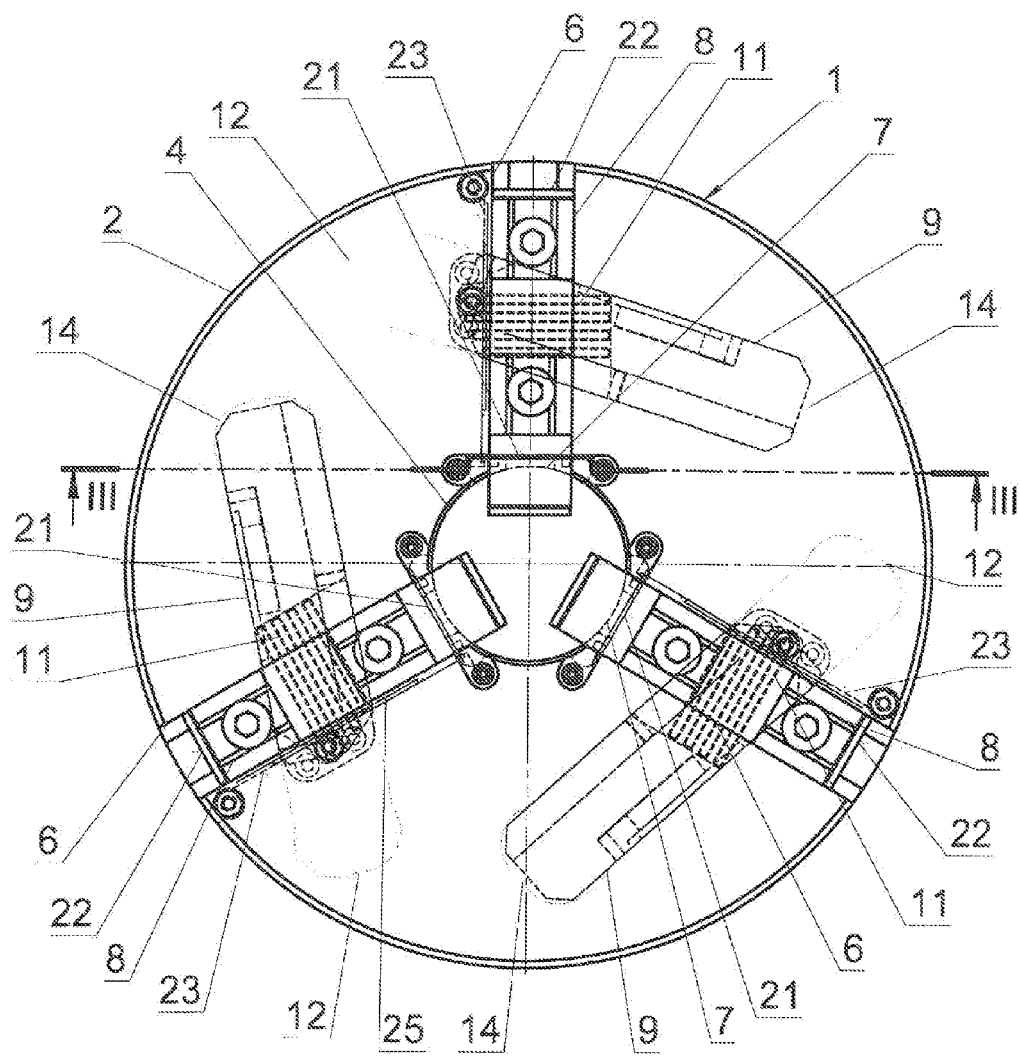
FIG. 1b shows a chuck in accordance with FIG. 1a, in the operational status of the clamping jaws which partially protrude into a through-hole disposed in the chuck body.
Figure 1C:
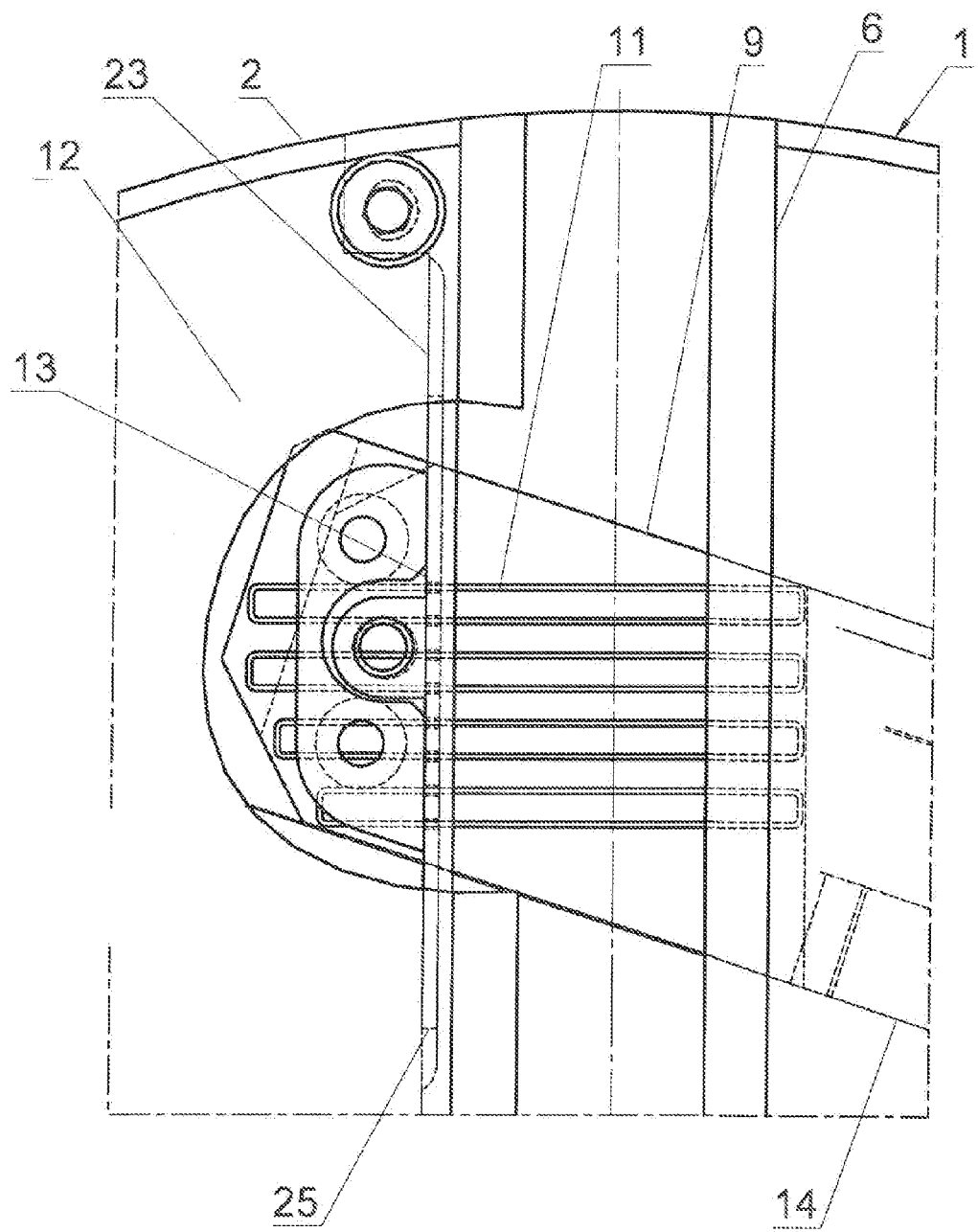

The chuck 1, shown in FIGS. 1a and 1b, comprises a chuck body 2, one free end of which is identified with the reference number 3 and the longitudinal axis of which is identified with the reference number 5. The free end 3 is provided with three clamping jaws 8 pointing in the direction of a workpiece to be clamped that is not shown, in order to hold the workpiece spatially centred on the chuck 1. Such chucks are mounted on machine tools in order to clamp and machine shafts, hollow cylinders and other rotationally symmetrical components.

A through-hole 4 is worked into the chuck body 2 aligned with the longitudinal axis 5 of the chuck body 2, and has an actuation piston inserted in it in an axially movable arrangement. The actuation piston can be moved back and forth pneumatically, hydraulically or electrically in order to provide both an advance movement and a clamping force of corresponding magnitude to hold the workpieces.

Furthermore, the chuck body is provided with three holding chambers 12 worked into it, with a wedge rod 9 inserted in each in an axially movable arrangement. The wedge rod 9 is in a driven active connection with the actuation piston via intermediate elements that are not shown, as a result of which during the axial movement of the actuation piston each of the three wedge rods 9 is moved synchronously back and forth.

Three radial guide grooves 6 running radially in the direction of the through-hole 4 are disposed in the free end 3 of the chuck body 2, and one of the clamping jaws 8 can be inserted into each of them. Each of the holding chambers 12 in this case is allocated to one of the guide grooves 6 and the wedge rods 9 pushed into the holding chambers 12 project into the guide grooves 6. The transitional area between the holding chamber 12 and the guide groove 6 is identified with the reference number 13 and is referred to below as the passage opening.

As soon as one of the clamping jaws 8 is pushed into the guide grooves 6 from outside, one of helical gearings 10 facing the wedge rod 9 that is worked onto the underside of the corresponding clamping jaw 8 comes into a positive-locking active connection with a helical gearing 11 worked onto the wedge rods 9. If, as a result, the corresponding wedge rod 9 is moved back and forth by the actuation piston, the two helical gearings 10 and 11 cause the three clamping jaws 8 to perform a synchronous radial advance movement, as a result of which they are moved in the direction of the through-hole 4, such that a workpiece can be centrally clamped between the three clamping jaws 8.

Chucks of this kind have proven effective in practice for various sizes of workpieces to be machined, because the adjusting range of the three clamping jaws 8 can be adjusted to differently sized workpiece diameters, meaning that the clamping jaws 8 only have to be changed if a workpiece with significantly different dimensions is to be machined. FIGS. 1a and 1b only differ in that the clamping jaws 8 are arranged in different positions, namely in FIG. 1a the clamping jaws 8 are completely within the guide groove 6 and in FIG. 1b the clamping jaws 8 partially protrude into the through-hole 4, with a result of which the position of the clamping jaws 8 is adapted to the dimension of the workpiece.

Nevertheless, the machining of workpieces causes contamination particles to penetrate the guide grooves 6. Such contamination particles can be caused, for example, by cooling or lubricating fluids and/or by the metallic chips that are cut off during machining of the workpiece. As soon as such contamination particles are deposited in the guide grooves 6, however, these get in between the corresponding clamping jaws 8 when they are subsequently moved, as with a result that the coefficient of friction between the pairing of the clamping jaw 8 and guide groove 6 is significantly increased. The chips and liquids also collect in the holding chambers 12, with the effect that this friction between the wedge rod 9 and the chuck body 2 is significantly increased.

Such an increase in friction means that the actuation force to be transferred onto the workpiece by the clamping jaws 8 is reduced because the friction forces between the clamping jaws 8 and the guide groove 6, as well as the wedge rod 9 and the chuck body 2, are opposed by the clamping force. Furthermore, the advance accuracy and/or precision of clamping are impaired by these contamination particles, because the synchronous movement of the clamping jaws 8 can be disrupted by these contamination particles.

The chuck 1 according to the present invention is intended to prevent this contamination between the clamping jaw 8 and the guide groove 6, as well as the wedge rod 9 and the chuck body 2, irrespective of the position of the clamping jaws 8, because the contamination particles should be prevented from getting into the guide grooves 6, or through the passage opening 13.

Figure 2A:
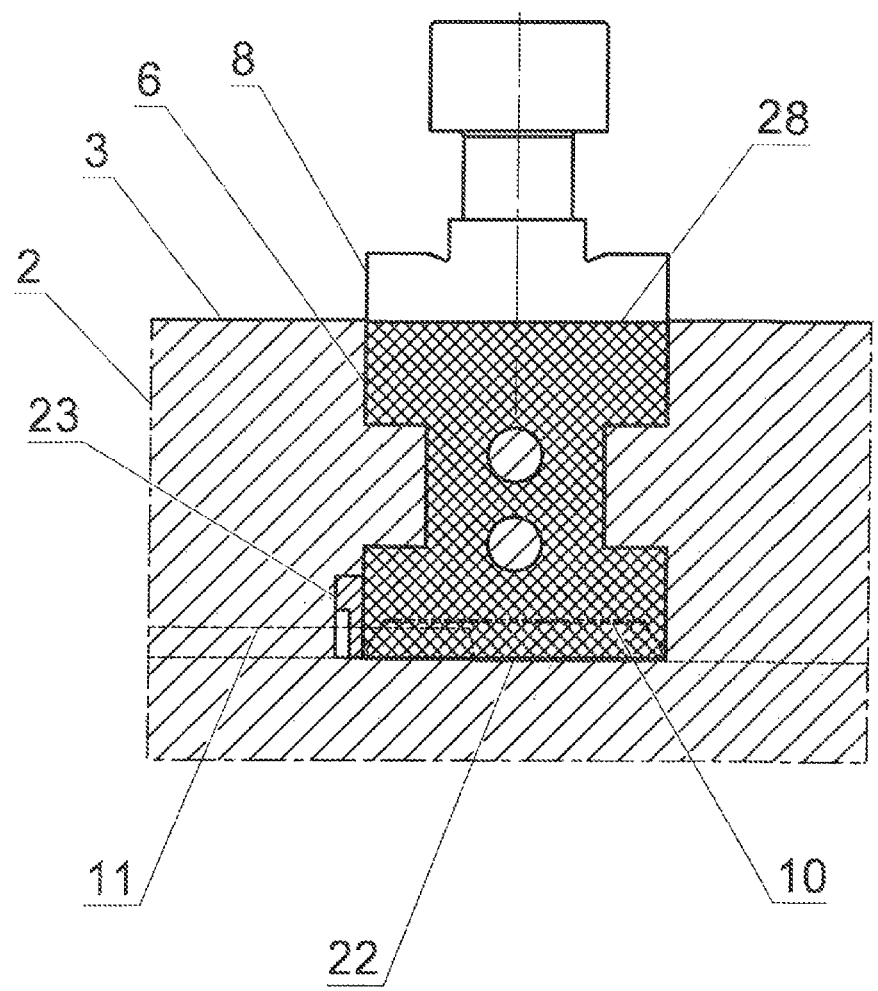
FIG. 2a shows the chuck in accordance with FIG. 1a along a section line II-II.

FIGS. 1a and 2a show the clamping jaws 8 arranged completely within the guide grooves 6. Sealing orifices 22 attached to the clamping jaws 8, and specifically to their opposite face ends, means that the space between the guide groove 6 and the clamping jaw 8 is closed.

The sealing orifice 22 comprises a carrier body 29 to which a sealing element 28 is attached, which is manufactured, for example, using the materials plastic, rubber or a metal/plastic fabric. The clamping jaws 8 can be inserted into the guide grooves 6 on both sides, meaning that one of the sealing orifices 22 is attached by screws to both face ends of the clamping jaws 8. As soon as the clamping jaw 8 is inserted into the guide groove 6, as a result, one of the sealing orifices 22 closes the space between the guide groove 6 and the clamping jaw 8, with the effect that contamination, especially chips and liquids, can no longer get into the guide groove 6.

Figure 2B:
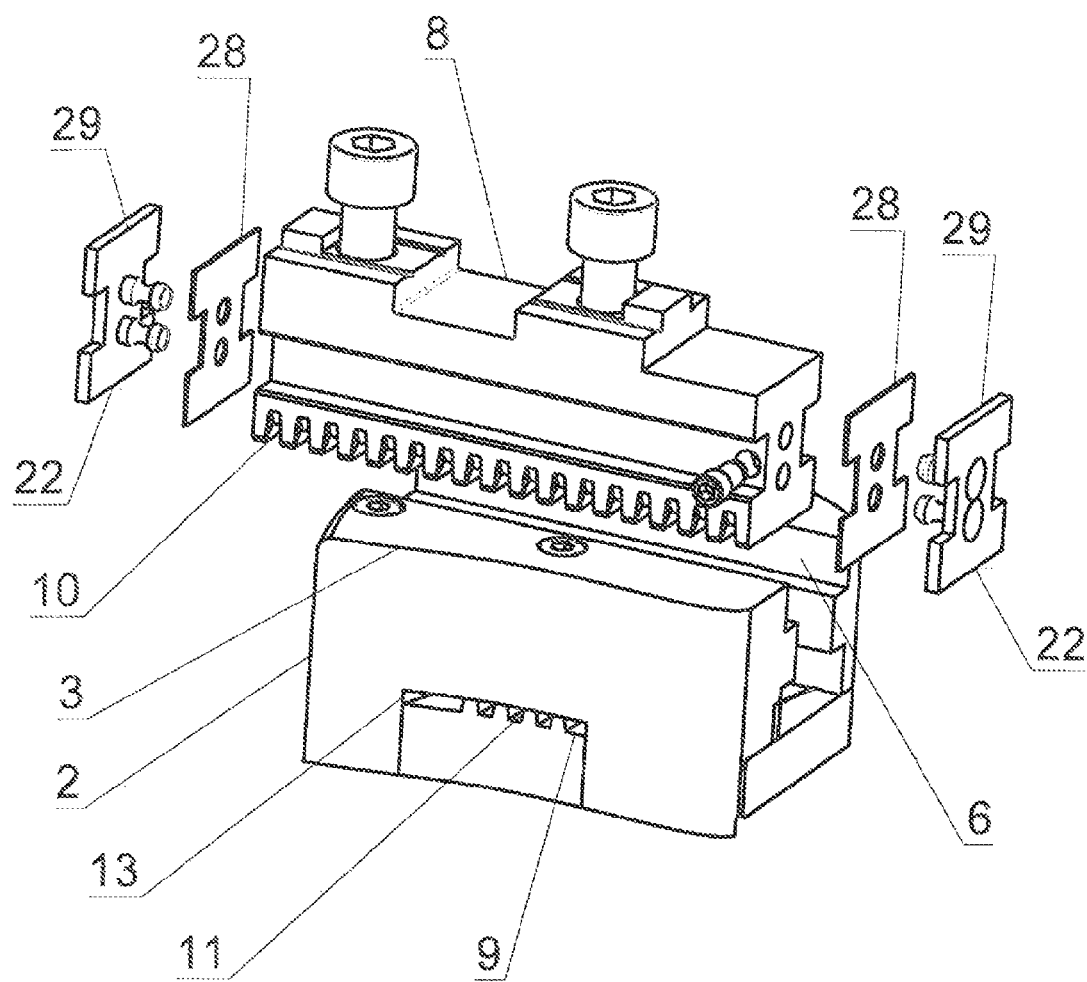
FIG. 2b shows the chuck in accordance with FIG. 1a in a perspective view, with two sealing orifices attached to opposite end faces thereof.
Figure 3:
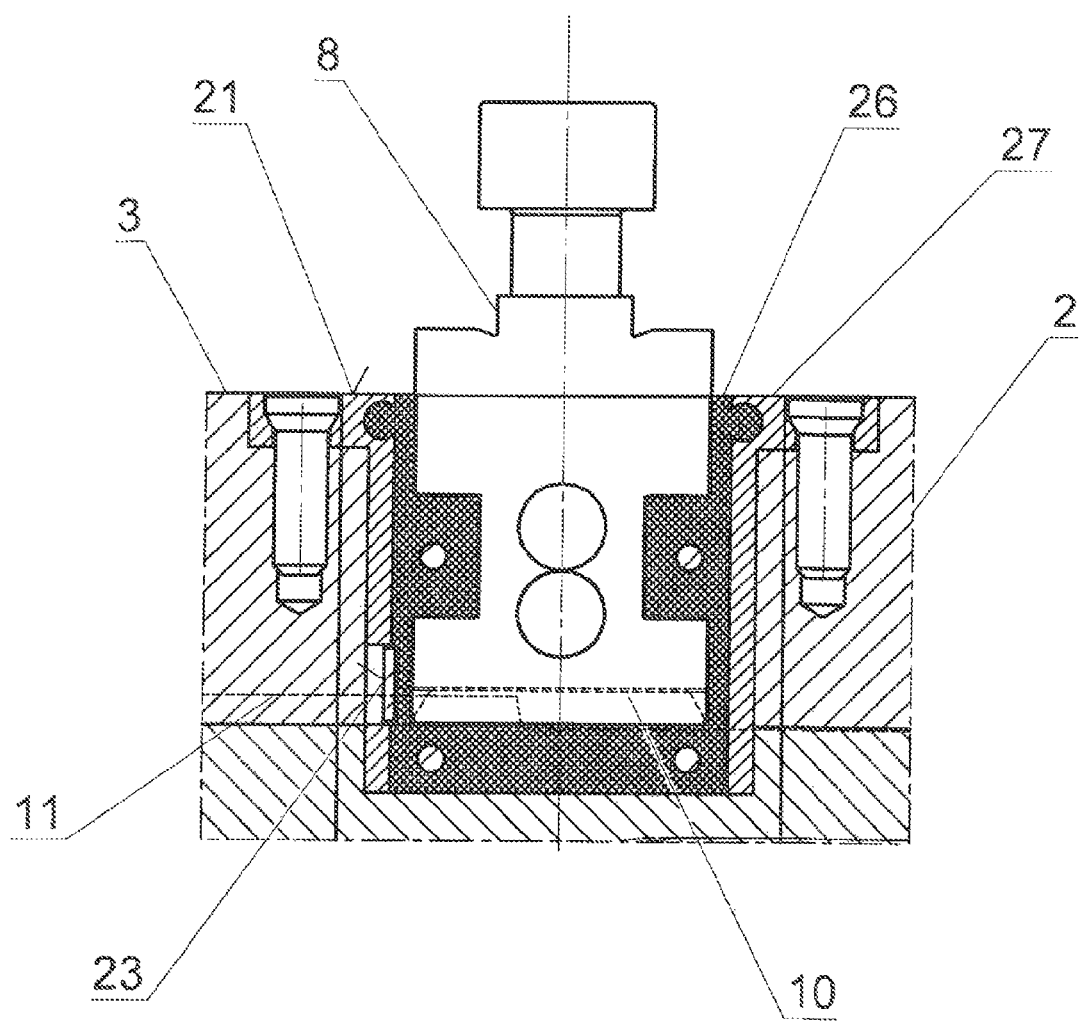
FIG. 3 shows the chuck in accordance with FIG. 1b along section line III-Ill.
Figure 4:
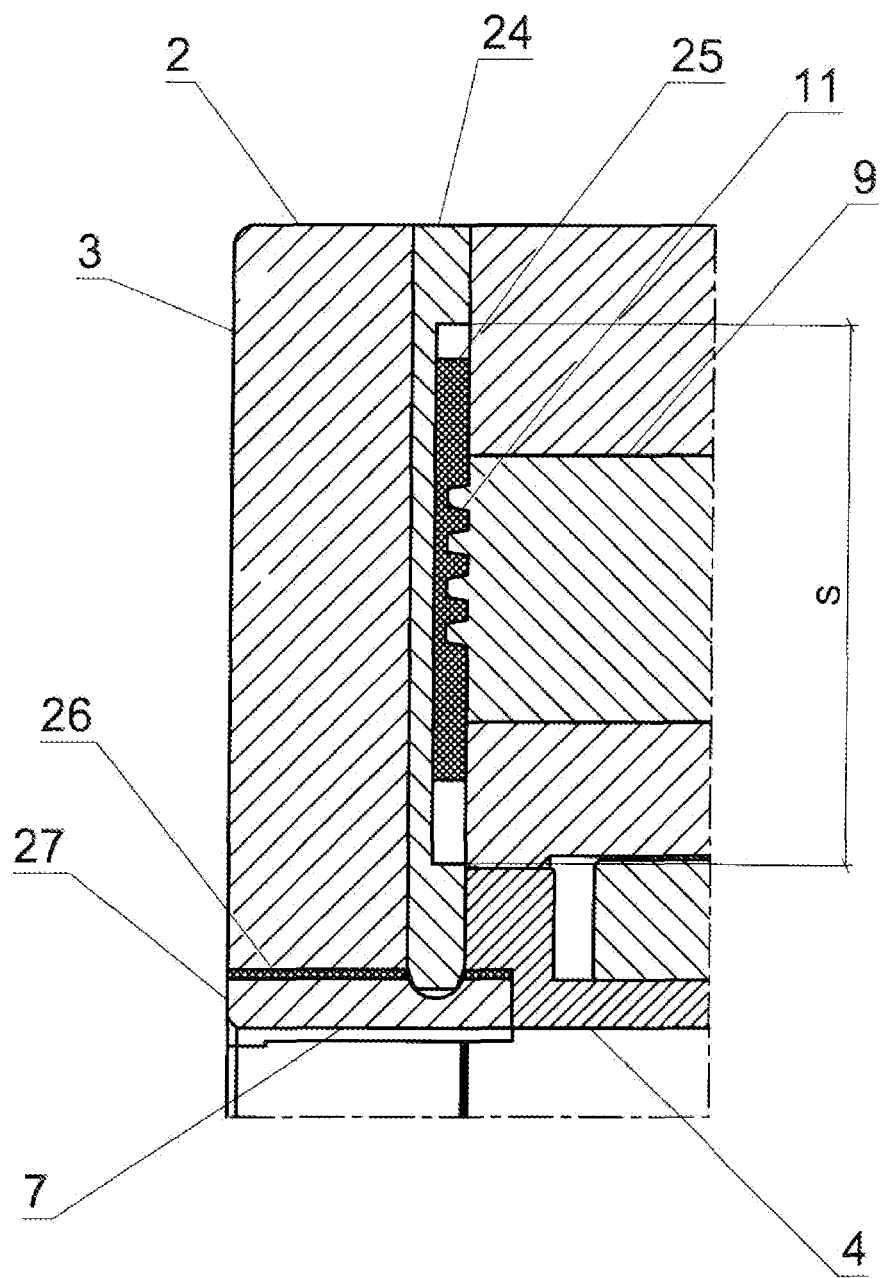
FIG. 4 shows the chuck in accordance with FIG. 1a along section line IV-IV.
Figure 5A:
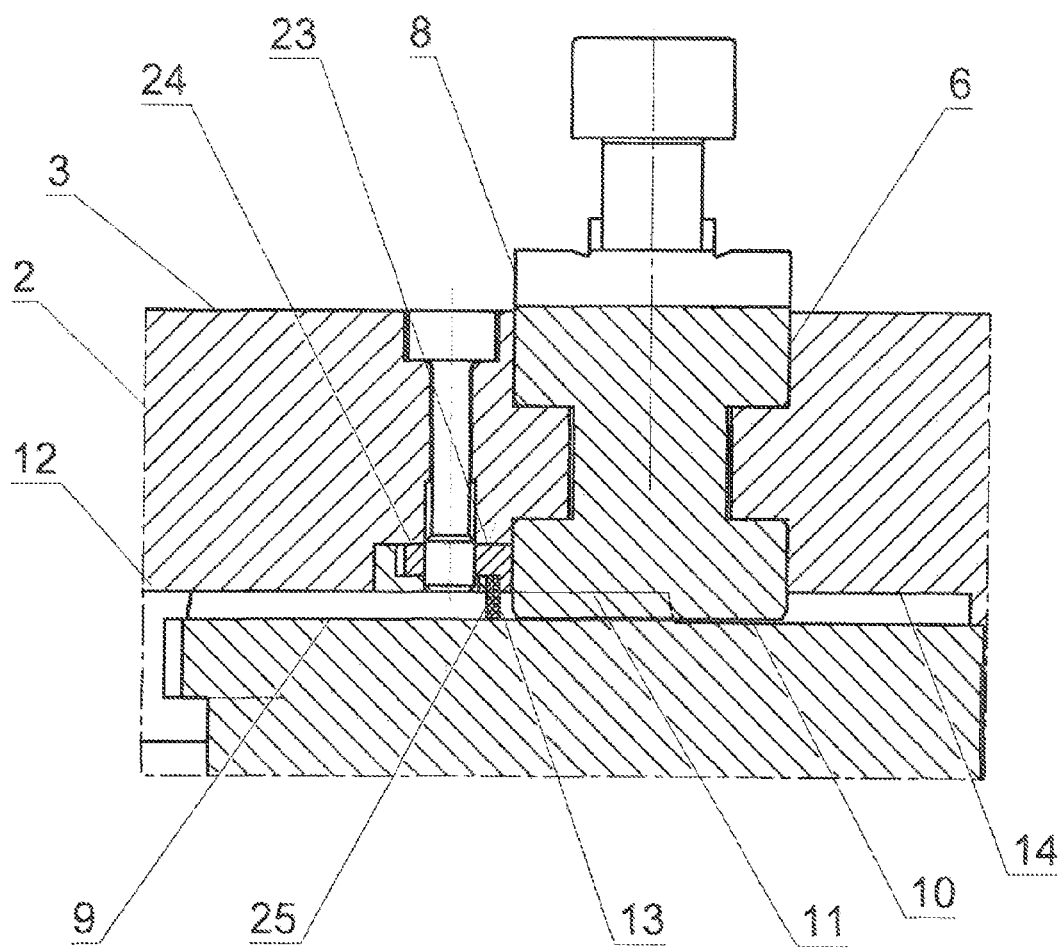
FIG. 5a shows the chuck in accordance with FIG. 1a along section line V-V.
Figure 5B:
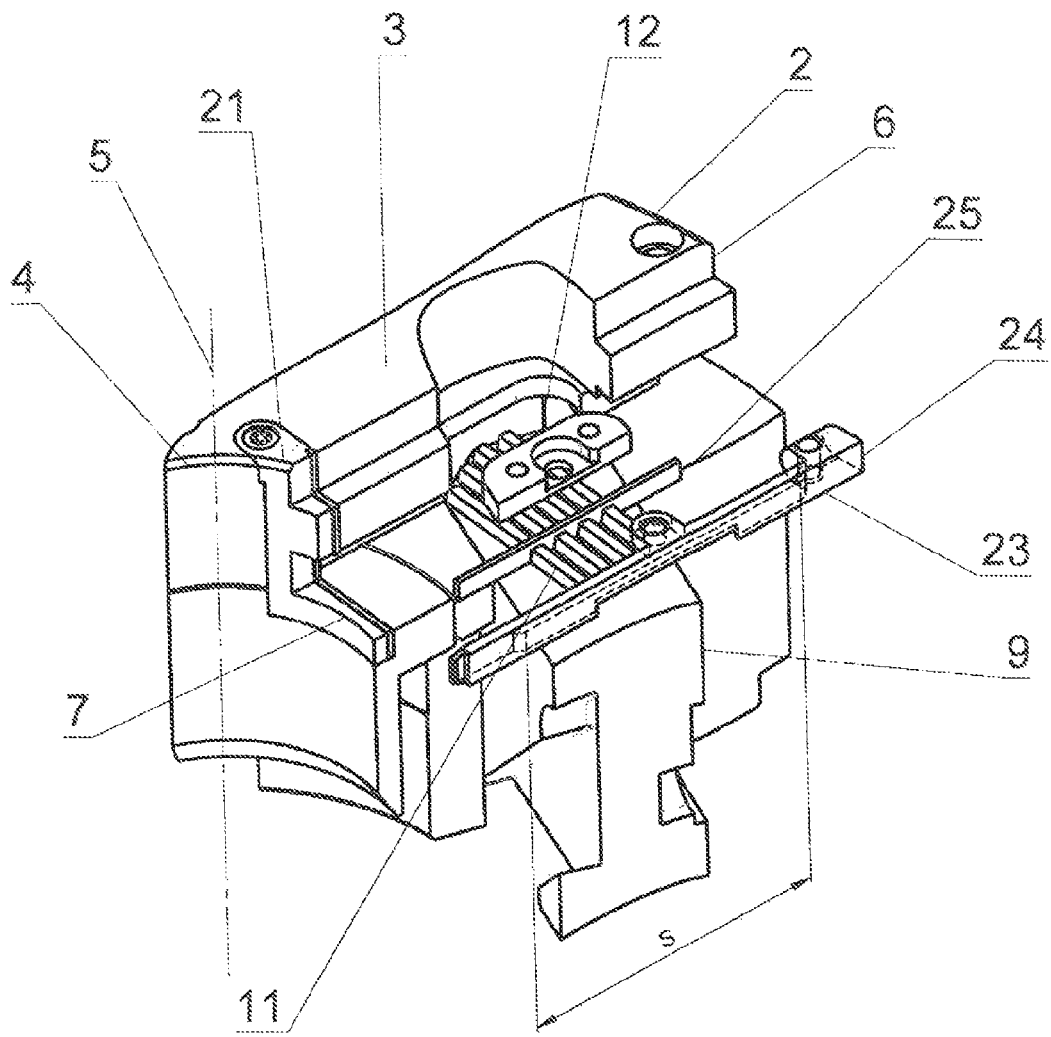
FIG. 5b shows the chuck in accordance with FIG. 1a in the area of the wedge rod, in a magnified and perspective view.

FIGS. 1b and 2b show that the particular clamping jaw 8 is partially inserted into the through-hole 4, and as a result the sealing orifices 22 attached to the face ends of the clamping jaws 8 are ineffective, or are too far away from the emergence of the guide groove 6 in the emergence 7 of the guide groove 6 into the guide groove 6, and are thus ineffective, because they no longer interact with the guide groove 6. In order to protect the guide groove 6 against the ingress of contamination nevertheless, a sealing body 21 is attached in the area of the emergence 7 of the guide groove 6 of the through-hole 4, and the corresponding clamping jaw 8 passes through the sealing body 21. As a result, the sealing body 21, together with the clamping jaw 8, closes entry emergence 7 of the corresponding guide groove 6 facing towards the through-hole 4.

FIGS. 1c and 3, 4, 5a, as well as 5b, show how the wedge rod 9 is closed by a sealing comb 23. The wedge rod 9 runs in a holding chamber 12 and emerges from this into the guide groove 6 in order to achieve a positively locking active connection between the helical gearing 11 worked onto the wedge rod 9 and the helical gearing 10 of the corresponding clamping jaw 8. A corresponding shift of the wedge rod 9 causes the corresponding clamping jaw 8 to be advanced radially, as a result of which the sealing comb 23 is moved synchronously with the corresponding clamping jaw 8 because it is connected to the wedge rod 9 in a driving connection.

The sealing comb 23 comprises a base body 24 with a pin-like external contour. The cross-section of the base body 24 is configured as a U-section. The gap between the two parallel legs of the base body 24 corresponds to the stroke travel s of the wedge rod 9 or the clamping jaw 8. A toothed comb 25 is attached to the face end of the base body 24 facing towards the wedge rod 9, in which case the toothed comb 25 comprises a metallic material and/or plastic. The toothed comb 25 has a toothed structure worked into it which corresponds to the helical gearing 11 of the wedge rod 9, with the effect that the toothed comb 25 is in a positive-locking active connection with the helical gearing 11 of the wedge rod 9.

The toothed comb 25 runs between the legs of the base body 24 that functions as a mount for the toothed comb 25.

Consequently, the sealing comb 23 completely closes the passage opening 13 of the holding chamber 12 together with the wedge rod 9, with the effect that no contamination gets into the holding chamber 12.

By means of these three design measures, which can be applied independently from one another, the space between the guide groove 6 and the clamping jaw 8 is closed with an airtight and/or watertight seal, or the wedge rod 9 and the sealing comb 23 are in airtight and/or watertight contact with one another, so that no contamination particles enter the holding chamber 12 of the wedge rod 9.

A compensation hole 14 for holding the wedge rod 9 is worked into the chuck body 2 opposite to the holding chamber 12. Even if contamination particles get into this, they do not impair the coefficient of friction because there is no driving active connection between the wedge rod 9 and the clamping jaw 8 in this area.

Figure 6:
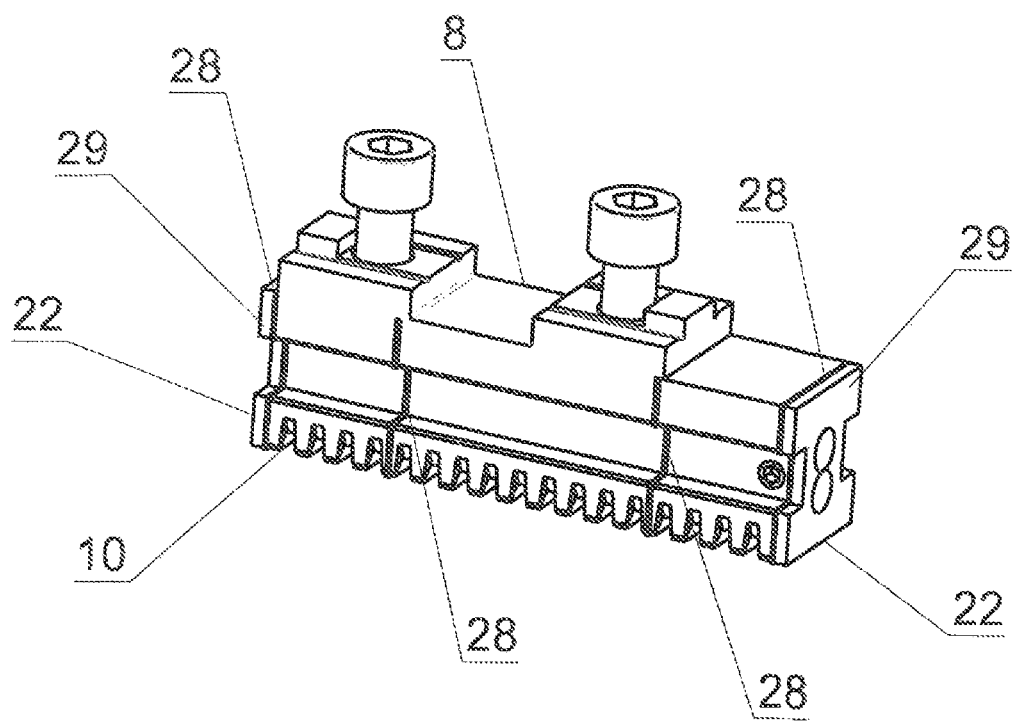
FIG. 6 shows the chucks in accordance with FIGS. 1a to 5b, with four sealing orifices attached thereto, in a perspective view.

FIG. 6 shows one of the clamping jaws 8 to which four of the sealing elements 28 are firmly attached. Two of the four sealing elements 28 in this case are attached to the free end faces of the clamping jaw 8 by means of the carrier body 29, with the effect that the external and internal sealing orifice 22 is facing towards the outer circumference of the chuck body 2, or the lengthways axis 5 of the chuck body 2.

If the clamping jaw 8 projects inwards or outwards from the chuck body 2 in this case, the sealing effect of the sealing orifice 22, or the sealing element 28, is lost because it is no longer arranged in the guide groove 6, but is instead located in free space. To exclude the possibility of dirt, coolant and other dirt particles penetrating the guide groove 6 in this position of the clamping jaw 8, further sealing elements 28 are provided which are located at a distance from and parallel to the two outer sealing orifices 22 and make watertight and/or airtight contact with the guide groove 6 and thus prevent dirt from getting into the guide groove 6. The clamping jaw 8 can be inserted into the guide groove 6 in two positions turned through 180°.

Each of the clamping jaws 8 can be produced as an individual component and is provided with the sealing orifices 22.

For accommodating and holding the corresponding sealing elements 28, the clamping jaw 8 has a groove worked into it, and into which the corresponding sealing element 28 can be clipped or inserted. The presence of the holding groove thus means that the individual sealing element 28 is secured on the clamping jaw 8.

The sealing element 28 normally consists of a metallic, flexurally rigid material, or of rubber, or of a plastic, or a mixture or fabric of these materials, with the effect that the sealing function does not become lost, even at high impact pressures, because the corresponding sealing element 28 is configured to be dimensionally stable. It is also conceivable for the sealing element 28 to be made from a plastic fabric, with metallic threads or particles worked into it for stiffening. In particular, the outer circumference of the particular sealing element 28 can be produced from a plastic material or rubber in order to achieve optimum contact between the sealing element 28 and the guide groove 6. The elastic properties of plastic fabrics, or rubber fabrics, namely mean that there is compensation for play between the particular sealing element 28 and the guide groove 6, without the relative movement of the clamping jaw 8 in the guide groove 6.

Such a sealing orifice 22 can be attached at any required position of the clamping jaw 8. As a result, provision must be given for the sealing orifice 22 to move; it should be mounted in a movable arrangement in relation to the clamping jaw 8. As soon as the sealing orifice 22 is inserted into the guide groove 6 of the chuck 1, the sealing orifice 22 is in watertight and/or airtight contact with the inside wall of the guide groove 6.

The invention claimed is:

1. A chuck comprising a chuck body having therein at least two guide grooves extending in a radial direction, a clamping jaw disposed in a movable arrangement in each of the guide grooves, the clamping jaw being provided with helical gearing extending in the direction of the body and a wedge rod movably mounted in the chuck body and the wedge rod being in a driving connection with a helical gearing of a clamping jaw, by means of a helical gearing disposed on the wedge rod, with a through-hole in the chuck body which emerges in a guide groove, wherein a sealing body is disposed on each of the guide grooves in an area of the through-hole, by means of which the guide groove is separated from the through-hole, and by means of which the clamping jaw can be moved, such that the clamping jaw and the sealing body effect airtight, and/or watertight, contact with one another, and a sealing orifice is disposed on opposite ends of the clamping jaws, with an outer contour of the sealing orifice being adapted to the inner contour of the guide groove, and the sealing orifice and the guide groove effect airtight and/or watertight contact with one another and that a sealing comb is provided in the chuck body in an area of the wedge rod and running generally at right angles thereto, such that the sealing comb engages in the helical gearing of the wedge rod and is driven to move radially during advance of the clamping jaws.

2. A chuck in accordance with claim 1, wherein the wedge rod is disposed in a holding chamber disposed in the chuck body and that a passage opening of the holding chamber of the wedge rod is sealed by the sealing comb.

3. A chuck in accordance with claim 2, wherein the sealing comb comprises a base body and a toothed comb.

4. A chuck in accordance with claim 3, wherein the base body comprises a metallic material and the toothed comb is of a selected one of rubber, plastic, and a rubber/plastic mixture.

5. A chuck in accordance with claim 3, wherein the base body is provided with a U-shaped cross-section, and that the toothed comb is mounted in a movable arrangement between two legs of the base body.

6. A chuck in accordance with claim 3, wherein the base body comprises a locating aid for the toothed comb, and the base body is firmly connected to the chuck body.

* * * * *